No. 713,645. Patented Nov. 18, 1902.
O. L. JOHNSON & L. P. MATTHEWS.
BUTTER CUTTER.
(Application filed Jan. 14, 1902.)

(No Model.) 2 Sheets—Sheet 1.

Witnesses
M. Blondel
E. Shaw

Inventors
O. L. Johnson
L. P. Matthews.
By
Onward Brock
Attorneys

THE NORRIS PETERS CO., PHOTO-LITHO., WASHINGTON, D. C.

No. 713,645. Patented Nov. 18, 1902.
O. L. JOHNSON & L. P. MATTHEWS.
BUTTER CUTTER.
(Application filed Jan. 14, 1902.)

(No Model.) 2 Sheets—Sheet 2.

Witnesses
Inventors
O. L. Johnson
L. P. Matthews

UNITED STATES PATENT OFFICE.

OSCAR L. JOHNSON AND LOUIS P. MATTHEWS, OF CLEVELAND, OHIO, ASSIGNORS OF THREE-FOURTHS TO A. T. BOND AND A. L. BALDWIN, OF CLEVELAND, OHIO.

BUTTER-CUTTER.

SPECIFICATION forming part of Letters Patent No. 713,645, dated November 18, 1902.

Application filed January 14, 1902. Serial No. 89,681. (No model.)

*To all whom it may concern:*

Be it known that we, OSCAR L. JOHNSON and LOUIS P. MATTHEWS, citizens of the United States, residing at Cleveland, in the county of Cuyahoga and State of Ohio, have invented a new and useful Butter-Cutter, of which the following is a specification.

This invention is an improved construction of butter-cutter, the object being to provide a device by means of which a tub of butter can be cut into blocks of definite size and weighed, thereby saving a great deal of time and labor.

Another object of the invention is to provide a device of this kind in which the cutting mechanism can be adjusted to cut the butter into large or small sized blocks; and a still further object is to provide a device which can be exceedingly strong and durable in construction and simple and efficient in operation.

With these objects in view the invention consists in the novel features of construction and combination, all of which will be fully described hereinafter and pointed out in the claims.

Figure 1:
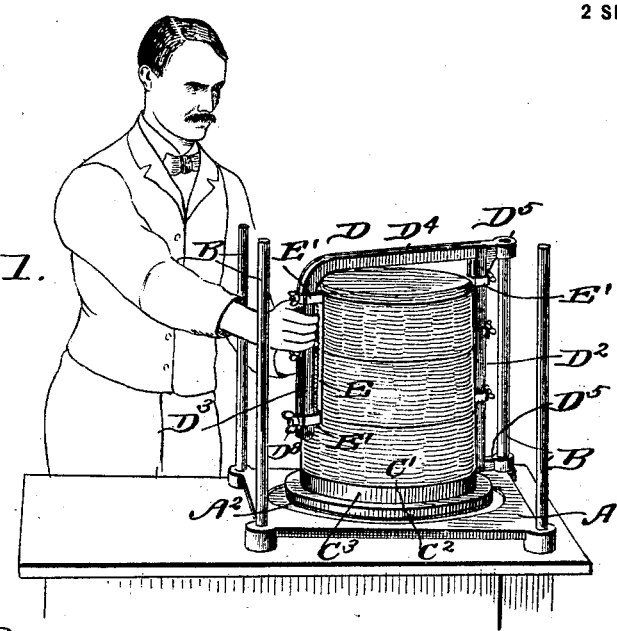
Figure 2:
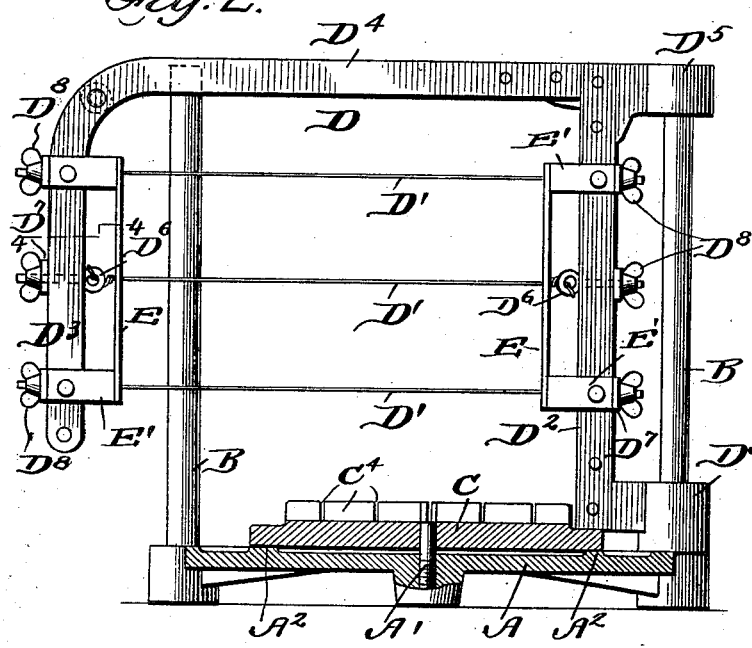
Figure 3:
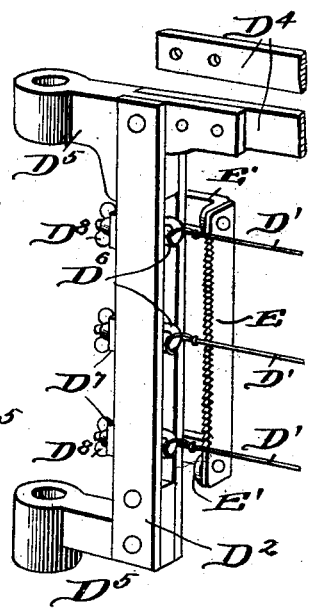
Figure 4:
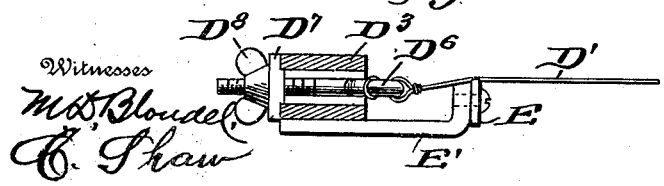
Figure 5:
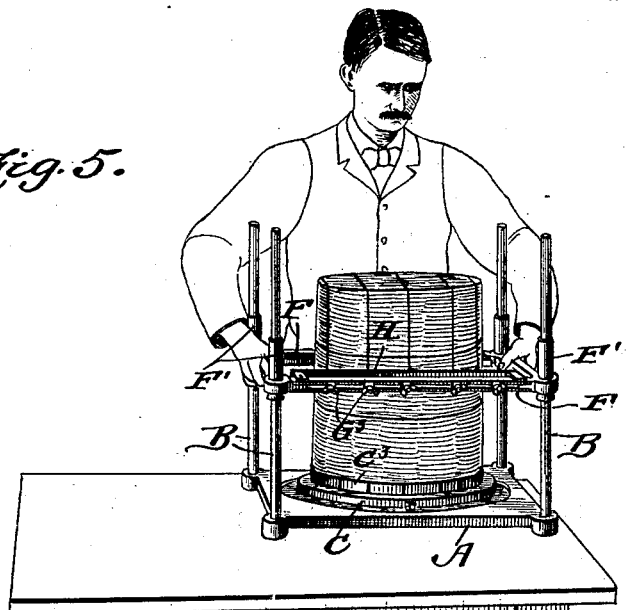
Figure 6:
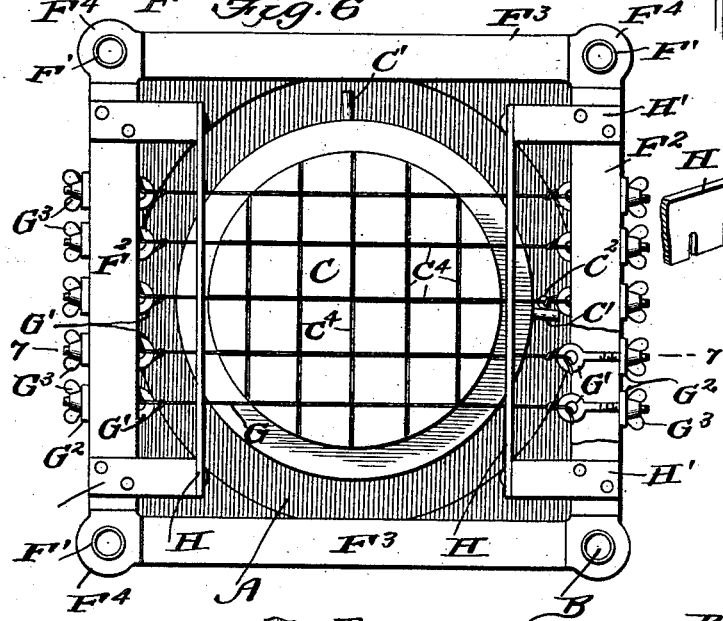
Figure 8:
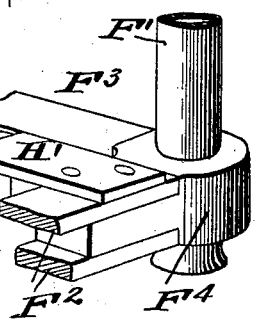
Figure 9:
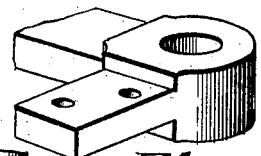
Figure 7:
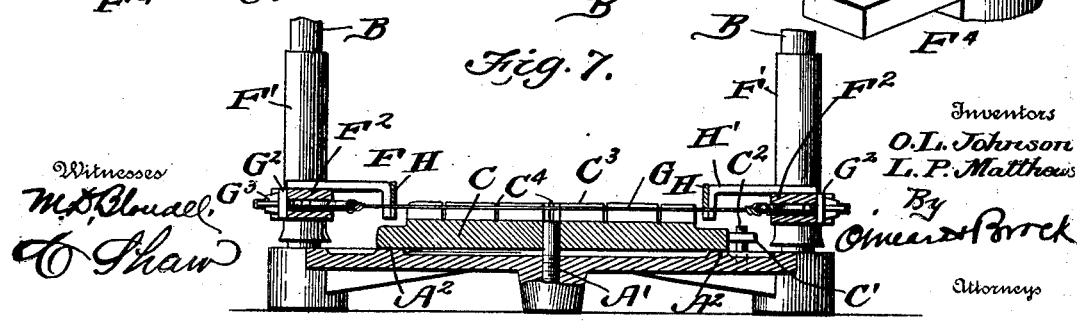

In the drawings forming part of this specification, Figure 1 is a perspective view illustrating the operation of our invention for the purpose of dividing the mass of butter horizontally. Fig. 2 is an elevation, partly in section, illustrating the horizontally-swinging frame carrying the cutting-wires for the purpose of subdividing the mass of butter horizontally. Fig. 3 is an enlarged detail view showing the means for and the manner of adjusting and securing the said horizontal wires. Fig. 4 is a sectional view on the line 4 4 of Fig. 2. Fig. 5 is a perspective view illustrating the operation of the machine for the purpose of subdividing the butter vertically, thereby cutting the mass of butter into a series of blocks of predetermined size and weight. Fig. 6 is a top plan view of a machine as constructed and arranged for effecting the before-mentioned vertical subdivision. Fig. 7 is a transverse section on the line 7 7 of Fig. 6. Figs. 8 and 9 are perspective views illustrating certain details of construction.

In carrying out our invention we employ a base A, preferably made of metal and essentially rectangular in shape, and from each corner of the said base extends a vertical standard B. The base has a central pivot-pin A', projecting upwardly therefrom, and the base is also formed with an annular track or projecting portion $A^2$, upon which rests the turn-table or circular board C, which is pivoted centrally upon the pivot-pin A' and turns upon the annular track or ring $A^2$. This turn-table or circular board has laterally-projecting pins C' projecting from the edge of the board or turn-table, said pins being preferably arranged ninety degrees apart and adapted to engage a stop-pin $C^2$, fixed into the base, so that the said turn-table will have a movement only through one-fourth of a circle.

Journaled upon one of the upright standards B and swinging across and above the turn-table C is the horizontally-swinging frame D, carrying the horizontal cutting-wires D'. The frame D comprises the vertically-slotted side pieces $D^2$ and $D^3$, connected by the top piece $D^4$, the bearing-sleeves $D^5$ being also connected to the slotted side piece $D^2$, as most clearly shown in Fig. 3. This swinging frame can be made up of a number of pieces, as illustrated in Fig. 3, or it can be made of a single piece, if so desired. The ends of the wires D' are fastened to screw-eyes $D^6$, said screw-eyes being arranged in the vertical slot of the side piece, the shank thereof passing through a shouldered washer $D^7$ and secured by means of a winged nut $D^8$, whereby a sufficient tension can be exerted upon the wires to hold them thoroughly tight.

In order to provide for the accurate adjustment of the wires and also to aid in subjecting them to tension, we provide the serrated bridge-plates E, which are securely fastened upon the inner ends of the arms E', fastened to the slotted side members $D^2$ and $D^3$, the wires D' being located in the serrations, and by having the plates E accurately fastened it will be readily understood that the wires D' can be accurately adjusted, inasmuch as the wires can be moved up or down a definite number of notches or serrations at each side, thereby insuring parallel adjustment of the side wires.

The butter to be cut is placed upon the turn-table or circular board C and one of the laterally-projecting pins brought into engagement with the stop-pin. The swinging arm is then swung through the arc of a circle with the upright as a center, and the cutting-wires D' will be forced horizontally through the mass of butter, thereby subdividing it into the desired number of subdivisions.

In practice we prefer to construct the turn-table or circular board with a central raised portion $C^3$, and in swinging the frame around through the arc of the circle the horizontal arm of the lower bearing-sleeve $D^5$ will clear the outer edge of the turn-table, as most clearly shown in Fig. 1.

After the mass of butter has been subdivided horizontally the swinging frame is removed and a vertically-movable frame placed upon the four uprights and forced downwardly upon the mass of butter, cutting it vertically into a series of blocks by means of a series of wires. After the frame has been forced down close to cut the butter in one direction the turn-table is moved through a quarter of a circle and the frame forced down a second time, thereby completing the cutting of butter into blocks heretofore referred to. This vertically-movable frame F comprises the tubular guide corner-pieces F', the horizontally-slotted side pieces $F^2$, and the solid end pieces $F^3$, said slotted and solid sides and ends being preferably connected to the integral lugs $F^4$, formed upon the tubular guiding corner-pieces F'. If desired, however, the frame F may be formed of a single piece.

The cutting-wires G are connected to the screw-eyes G', which are arranged in the horizontally-slotted sides $F^2$, passing through shouldered washer-plates $G^2$ and having thumb-nuts $G^3$ screwed upon their outer ends. These wires also pass across the serrated bridge-plates H, arranged parallel with the slotted sides $F^2$, and by means of the arms H' and by means of these bridge-plates the tension-wires can be increased and the parallel adjustment of said wires maintained with accuracy.

The raised portion $C^3$ of the turn-table or circular board is grooved transversely and longitudinally, as shown at $C^4$, in order to receive the cutting-wires G, thereby permitting said wires to pass entirely through the butter. A plurality of such transverse and longitudinal grooves are produced, so as to accommodate the cutting-wires G in their various adjustments. The tubular guiding corner-pieces of the horizontal frame slide freely upon the upright standards B, so that the vertical movement of the said frame is accurate and uniform. As before stated, however, after the butter has been subdivided horizontally the swinging frame is removed. The vertically-movable frame is then arranged upon the four uprights and forced down upon the butter. The frame is then elevated above the butter, the turn-table moved through one-quarter of a circle, and the frame again forced down, thereby completing the cutting of the butter into blocks of definite sizes and weight. The blocks can be sold over the counter or they can be molded and packed for sale or shipment and the incomplete blocks cut off from the edges of the mass of butter are worked into a mass placed upon the center of the block and subdivided, as hereinbefore described, thereby cutting up the entire mass of butter into blocks of a predetermined size and weight.

The entire device is preferably constructed of metal and galvanized to prevent rusting.

It will thus be seen that we provide an exceedingly cheap, simple, and efficient device whereby a tub of butter can be quickly and easily cut up into blocks of predetermined size and weight.

Having thus fully described our invention, what we claim as new, and desire to secure by Letters Patent, is—

1. A device for cutting butter into blocks, comprising a base having upright standards at each end, a central rotary turn-table pivoted upon the base, the upper face of said turn-table or board being grooved transversely and longitudinally, the laterally-projecting pins carried by said turn-table or board and the stop-pin arranged upon the base to engage the said laterally-projecting pins, the horizontally-swinging frame adapted to be journaled upon one of the uprights and provided with horizontally-cutting wires, and the vertically-movable frame provided with corner-guides adapted to travel upon the upright standards, said vertically-movable frame having a plurality of cutting-wires, substantially as described.

2. In a butter-cutting device, the combination with a suitable base, of upright standards secured to said base, a vertical slotted arm hinged to one of said standards, a horizontal arm projecting from the upper portion of the vertical arm, said horizontal arm having its free end bent downwardly and slotted, adjustable wire members stretched from the downwardly-bent portion of the horizontal arm to the vertical arm, brackets secured to said arms, and a serrated metal strip secured to each of said pair of brackets, said strips extending transversely of the wires, and having their serrated edges in contact with the wires.

3. A device for cutting butter into blocks comprising a base having upright standards at each end, a central rotary turn-table pivoted upon the base, the upper face of said turn-table or board being grooved transversely and longitudinally, laterally-projecting pins carried by said table or board, and a stop-pin arranged upon the base to engage the said laterally-projecting pins, a horizontally-swinging frame pivoted upon one of the uprights, slots in the upright members of said frame and cutting-wires secured to said frame, passing through said slots, and a vertically-movable frame, provided with corner-guides, traveling upon the upright standards, said frame having its opposite members slotted, and a plurality of cutting-wires passing through said slots and secured to said frame, substantially as described.

4. A device for cutting butter into blocks, comprising a base having upright standards at each end, a central rotary turn-table pivoted upon the base, the upper face of said turn-table or board being grooved transversely and longitudinally, laterally-projecting pins carried by said turn-table or board, and a stop-pin arranged upon the base to engage the said laterally-projecting pin, a horizontally-swinging frame pivoted upon one of the uprights and removable therefrom, slots in the upright members of said frame, screw-eyes passing through said slots, cutting-wires secured to said screw-eyes, and thumb-nuts on said screw-eyes for drawing said wires taut, and a vertically-removable frame provided with corner-guides, traveling upon the upright standards, and removable therefrom, said frame having its opposite members slotted, screw-eyes through said slots, cutting-wires secured to said screw-eyes, and a thumb-nut on said screw-eyes for drawing the said wires taut, substantially as described.

5. A device for cutting butter into blocks, comprising a base having upright standards at each end, a central rotary turn-table pivoted upon the base, the upper face of said turn-table or board being grooved transversely and longitudinally, laterally-projecting pins carried by said turn-table or board and a stop-pin arranged upon the base to engage the said laterally-projecting pin, a swinging frame pivoted upon one of the uprights and removable therefrom, slots in the upright members of said frame, screw-eyes passing through said slots, cutting-wires secured to said screw-eyes, a serrated plate secured in proximity to said slot, over which the wires pass, and thumb-nuts on said screw-eyes for drawing said wires taut, and a vertically-movable frame provided with corner-guides, traveling upon the upright standards, and removable therefrom, said frame having its opposite members slotted, screw-eyes passing through said slots, cutting-wires secured to said screw-eyes, a serrated plate secured in proximity to said slot, over which the wires pass, and a thumb-nut on said screw-eyes for drawing the said wires taut, substantially as described.

OSCAR L. JOHNSON.
LOUIS P. MATTHEWS.

Witnesses:
WM. G. GEIER,
JAMES A. FARRELL.